Z. WORRALL.
Lamp.
No. 2,448. Patented Feb. 7, 1842.
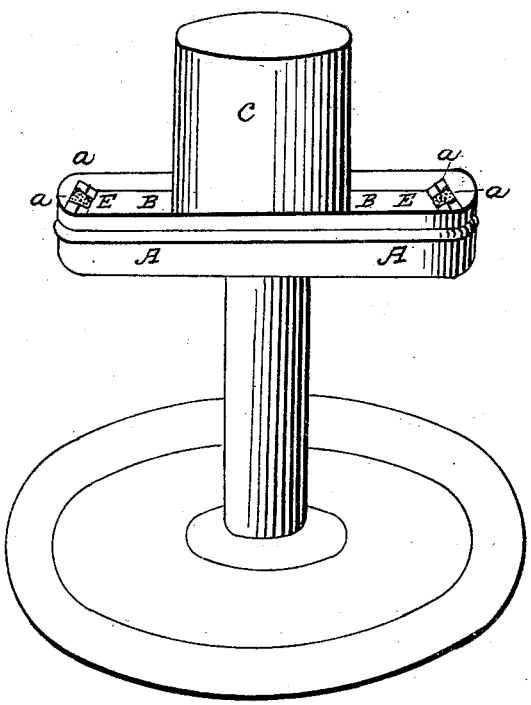
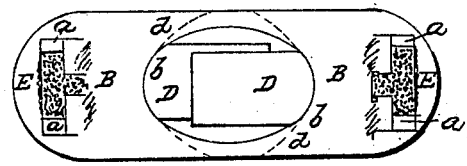
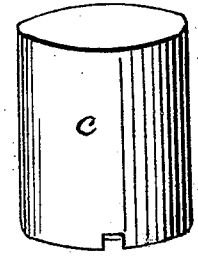

UNITED STATES PATENT OFFICE.

ZEBULON WORRALL, OF CHESTER HILL, OHIO.

LAMP FOR BURNING LARD.

Specification of Letters Patent No. 2,448, dated February 7, 1842.

*To all whom it may concern:*

Be it known that I, ZEBULON WORRALL, of Chester Hill, in the county of Athens and State of Ohio, have invented an improvement in the manner of constructing a lamp for the burning of lard, tallow, and other fatty substances analogous thereto; and I do hereby declare that the following is a full and exact description thereof.

In the accompanying drawing, Figure 1, is a perspective view of my lamp, which I denominate the " self-supplying lard lamp."

A, A, is a flat dish, or cup, within which the wick and a portion of the material to be burned is contained.

B, B, Figs. 1, and 2, is the upper plate of this dish, Fig. 2, being a top view thereof, with the reservoir C, Figs. 1, and 3, removed. The dish A, A, may be about three fourths of an inch deep, and the plate B, B, about a quarter of an inch from the top, having a space below it of about half an inch in depth. Within this the wicks D, D, are placed, and one of the ends of these rise up through burners at E, E. Wires of copper or other good conductor of heat, pass up through the burners, as at $a$, $a$, and extend down to the bottom of the dish, and to some distance along it, to which bottom they are soldered; these serve to keep the lard, tallow, &c., in a fluid state, in a manner well known, this device having been frequently employed in lamps intended for a like purpose.

The reservoir C, is for containing a supply of the concrete fatty matter which is to be burned. It consists of an oval, or other suitably formed, cup, which is to be filled with the lard, tallow, or other material, and is then to be inverted, and its open end inserted within the cup, or dish; this is passed through the opening $b$, $b$, in the plate B, B, which it is made to fit; and it is to descend nearly to the bottom of this space, leaving room for the wicks merely. The notch $c$, which is at its lower end when in place, is for the admission of air, without which it would not give the regular supply to the dish or cup.

In preparing this lamp for use, after inserting the wicks, a portion of the fat to be burned is melted and poured into the dish so as to rise to the height of about an eighth of an inch within it; it is important that it be not allowed to rise to too great a height, or the lamp might be thereby caused to overflow, which will never be the case when the foregoing precaution is observed. The reservoir C, is then to be inserted, and the lamp will be ready for use. When the wick, or wicks, are ignited, the lard, or other material, within the dish will be quickly fused, and this will convey a sufficient degree of heat to the reservoir to cause the lard, or fat, within it also to fuse and descend; but it cannot flow out of it into the dish only as air is supplied through the notch $c$, which will insure its regularity. The dotted lines $d$, $d$, Fig. 2, show the pieces of pieces of sheet-tin, or other metal, which extend from the bottom to the top of the space within the cup, for the purpose of preventing the ready flow of the melted fat within it, from one end to the other, when the lamp is not carried in a horizontal position.

I am aware that a fountain lamp for burning lard was patented some years since in England, in which the lard was kept in a melted state by means of a metallic rod heated by the blaze of the lamp; this I do not claim; but What I do claim as my invention, and desire to secure by Letters Patent is—

The manner in which I arrange the wick tubes and heaters in combination with the movable fountain, C, and dish A, A, the heaters passing down through the wick tubes into the disk, and thence to the bottom of the reservoir, an arrangement of the heaters not before used in any fountain lamp for burning lard, and which on account of its keeping the lard in the dish continually melted render this kind of lamp more available for burning concrete substances than heretofore.

ZEBULON WORRALL.

Witnesses:
THOS. P. JONES,
JAS. MURRAY.